(12) United States Patent
Vaknin et al.

(10) Patent No.: US 12,726,830 B2
(45) Date of Patent: Sep. 1, 2026

(54) OPTIMIZING A CELLULAR NETWORK USING A MACHINE LEARNING MODEL

(71) Applicant: QGT International, Inc., San Diego, CA (US)

(72) Inventors: Yaniv Vaknin, Tel Aviv (IL); Daniel Yellin, Raanana (IL); David Ronen, Kfar Saba (IL); Ehud Mashraky, Bruchin (IL)

(73) Assignee: QUALCOMM Incorproated, San Diego, CA (US)

( * ) Notice: Subject to any disclaimer, the term of this patent is extended or adjusted under 35 U.S.C. 154(b) by 671 days.

(21) Appl. No.: 17/929,213

(22) Filed: Sep. 1, 2022

(65) Prior Publication Data

US 2023/0063522 A1 Mar. 2, 2023

Related U.S. Application Data

(60) Provisional application No. 63/240,009, filed on Sep. 2, 2021.

(51) Int. Cl.
*H04W 16/18* (2009.01)
*H04W 84/04* (2009.01)

(52) U.S. Cl.
CPC .......... *H04W 16/18* (2013.01); *H04W 84/042* (2013.01)

(58) Field of Classification Search
CPC ....... H04W 4/80; H04W 8/005; H04W 16/20; H04W 64/006; H04W 4/029; H04W 72/0453; H04W 72/30; H04W 72/541; H04W 4/06; H04W 4/021; H04W 84/20; H04W 84/12; H04W 4/08; H04W 16/10; H04W 36/20; H04W 16/18; H04W 24/02; H04W 24/04; H04W 84/042; H04L 67/51; H04L 67/025; H04L 41/0823;
(Continued)

(56) References Cited

U.S. PATENT DOCUMENTS 6,799,044 B1 * 9/2004 Wesby .................. H04W 16/10 455/63.1
9,392,471 B1 * 7/2016 Thomas .................. H04L 43/16
9,980,187 B2 5/2018 Dribinski et al.
(Continued)

FOREIGN PATENT DOCUMENTS

CN 112818596 A * 5/2021 ........... G06V 10/751
WO WO-2016095826 A1 6/2016
(Continued)

OTHER PUBLICATIONS

International Search Report and Written Opinion—PCT/US2022/075926—ISA/EPO—Dec. 8, 2022.

*Primary Examiner* — David Q Nguyen
(74) *Attorney, Agent, or Firm* — Harrity & Harrity, LLP

(57) ABSTRACT

Various aspects of the present disclosure generally relate to wireless communication. In some aspects, a network node may obtain a machine learning (ML) model trained to provide one or more predicted channel interference (CI) indicators informative of channel interference between cells of a cellular network. The network node may calculate, using the ML model, the one or more predicted CI indicators using data characterizing a given cell and one or more neighbor cells of the given cell. The network node may provide the one or more predicted CI indicators. Numerous other aspects are described.

20 Claims, 8 Drawing Sheets

(58) Field of Classification Search
CPC ........ G06V 10/751; G06F 30/27; G06N 3/09; G06N 5/01; G06N 20/10
USPC ........................................ 455/446, 447, 63.1
See application file for complete search history.

(56) References Cited

U.S. PATENT DOCUMENTS

| | | | | |
|---|---|---|---|---|
| 12,207,114 | B2 * | 1/2025 | Breuer .................. | H04W 24/02 |
| 2014/0126403 | A1 * | 5/2014 | Siomina ................ | H04W 24/10<br>370/252 |
| 2016/0262065 | A1 * | 9/2016 | Axmon ............... | H04W 36/324 |
| 2017/0222746 | A1 * | 8/2017 | Kang .................... | H04W 16/24 |
| 2019/0215729 | A1 * | 7/2019 | Oyman ............... | H04L 65/1016 |
| 2019/0357057 | A1 * | 11/2019 | Cirkic .................. | H04B 17/382 |
| 2020/0076520 | A1 * | 3/2020 | Jana ....................... | G06N 20/00 |
| 2020/0106536 | A1 | 4/2020 | Bedekar | |
| 2020/0169895 | A1 | 5/2020 | Chen et al. | |
| 2020/0314799 | A1 * | 10/2020 | Henry ..................... | H04W 4/80 |
| 2020/0322960 | A1 * | 10/2020 | Monajemi ............ | H04B 17/373 |
| 2020/0366385 | A1 | 11/2020 | Ge et al. | |
| 2020/0413316 | A1 | 12/2020 | Isaksson et al. | |
| 2021/0037540 | A1 * | 2/2021 | Tsuchiya ........... | H04W 72/0453 |

FOREIGN PATENT DOCUMENTS

| | | | | |
|---|---|---|---|---|
| WO | WO-2020214007 | A1 * | 10/2020 | ............ H04W 72/23 |
| WO | 2021064713 | A1 | 4/2021 | |

* cited by examiner

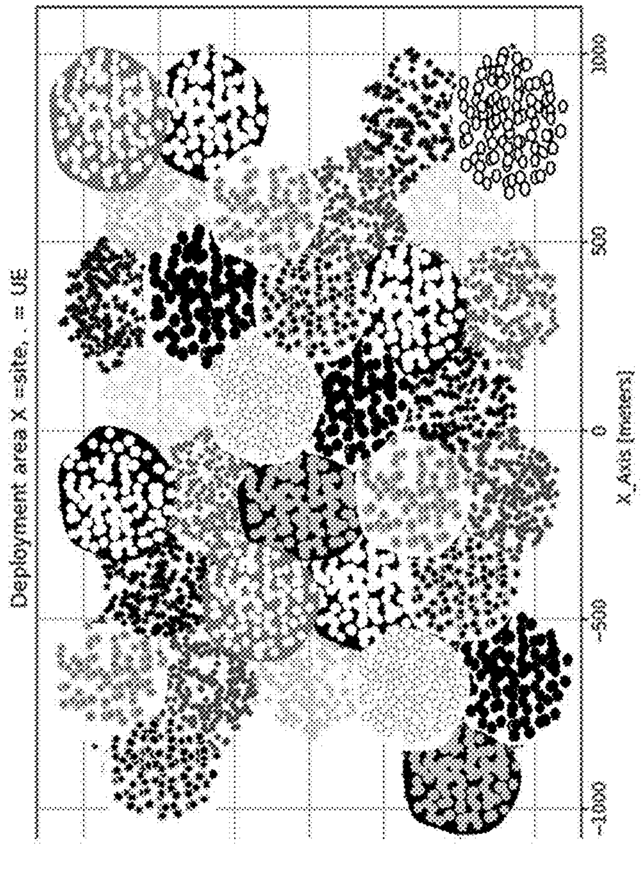
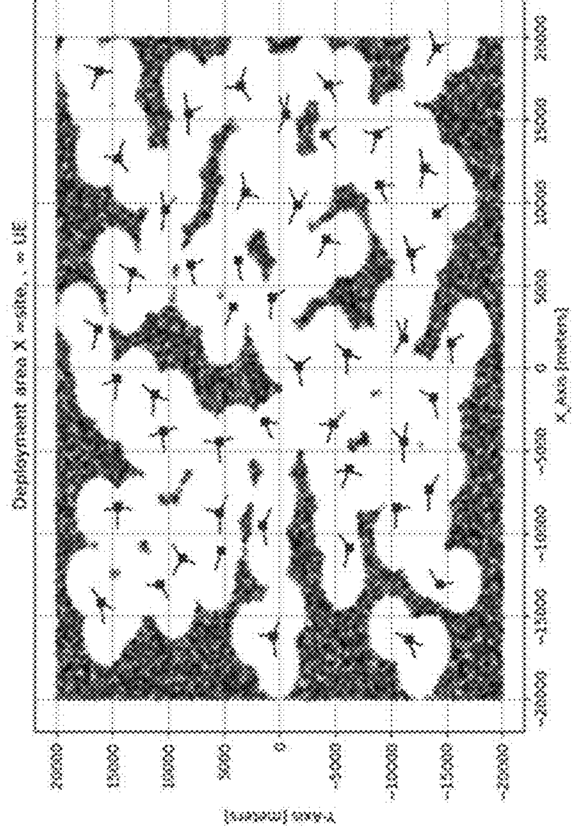
FIG. 6

3GPP TR 38.901 version 14.0.0 Release 14

Table 7.4.1-1: Pathloss models

| Scenario | LOS/NLOS | Pathloss [dB], $f_c$ is in GHz and $d$ is in meters, see note 6 | Shadow fading std [dB] | Applicability range, antenna height default values |
|---|---|---|---|---|
| RMa | LOS | $PL_{RMa-LOS} = \begin{cases} PL_1 & 10m \le d_{2D} \le d_{BP} \\ PL_2 & d_{BP} \le d_{2D} \le 10km \end{cases}$, see note 5<br>$PL_1 = 20\log_{10}(40\pi d_{3D} f_c / 3) + \min(0.03h^{1.72}, 10)\log_{10}(d_{3D}) - \min(0.044h^{1.72}, 14.77) + 0.002\log_{10}(h) d_{3D}$<br>$PL_2 = PL_1(d_{BP}) + 40\log_{10}(d_{3D} / d_{BP})$ | $\sigma_{SF} = 4$<br>$\sigma_{SF} = 6$ | $h_{BS} = 35m$<br>$h_{UT} = 1.5m$<br>$W = 20m$<br>$h = 5m$<br>h = avg. building height<br>W = avg. street width<br>The applicability ranges:<br>$5m \le h \le 50m$<br>$5m \le W \le 50m$<br>$10m \le h_{BS} \le 150m$<br>$1m \le h_{UT} \le 10m$ |
| | NLOS | $PL_{RMa-NLOS} = \max(PL_{RMa-LOS}, PL'_{RMa-NLOS})$ for $10m \le d_{2D} \le 5km$<br>$PL'_{RMa-NLOS} = 161.04 - 7.1\log_{10}(W) + 7.5\log_{10}(h) - (24.37 - 3.7(h/h_{BS})^2)\log_{10}(h_{BS}) + (43.42 - 3.1\log_{10}(h_{BS}))(\log_{10}(d_{3D}) - 3) + 20\log_{10}(f_c) - (3.2(\log_{10}(11.75h_{UT}))^2 - 4.97)$ | $\sigma_{SF} = 8$ | |
| UMa | LOS | $PL_{UMa-LOS} = \begin{cases} PL_1 & 10m \le d_{2D} \le d'_{BP} \\ PL_2 & d'_{BP} \le d_{2D} \le 5km \end{cases}$, see note 1<br>$PL_1 = 28.0 + 22\log_{10}(d_{3D}) + 20\log_{10}(f_c)$<br>$PL_2 = 28.0 + 40\log_{10}(d_{3D}) + 20\log_{10}(f_c) - 9\log_{10}((d'_{BP})^2 + (h_{BS} - h_{UT})^2)$ | $\sigma_{SF} = 4$ | $1.5m \le h_{UT} \le 22.5m$<br>$h_{BS} = 25m$ |
| | NLOS | $PL_{UMa-NLOS} = \max(PL_{UMa-LOS}, PL'_{UMa-NLOS})$ for $10m \le d_{3D} \le 5km$<br>$PL'_{UMa-NLOS} = 13.54 + 39.08\log_{10}(d_{3D}) + 20\log_{10}(f_c) - 0.6(h_{UT} - 1.5)$ | $\sigma_{SF} = 6$ | $1.5m \le h_{UT} \le 22.5m$<br>$h_{BS} = 25m$<br>Explanations: see note 3 |
| | | Optional $PL = 32.4 + 20\log_{10}(f_c) + 30\log_{10}(d_{3D})$ | $\sigma_{SF} = 7.8$ | |

FIG. 7

OPTIMIZING A CELLULAR NETWORK USING A MACHINE LEARNING MODEL

CROSS-REFERENCE TO RELATED APPLICATION

This Patent application claims priority to U.S. Provisional Patent Application No. 63/240,009, filed on Sep. 2, 2021, entitled "OPTIMIZING A NETWORK USING MACHINE LEARNING MODEL," and assigned to the assignee hereof. The disclosure of the prior Application is considered part of and is incorporated by reference in this Patent Application.

TECHNICAL FIELD

The presently disclosed subject matter relates to cellular communication and, in particular, to systems and methods of optimizing a cellular network using machine learning.

BACKGROUND

Mobile operators face a growing need to optimize and to maintain network performance. The network performance can be assessed with the help of quantifiable performance metrics known as key performance indicators (KPI). Among such KPIs are KPIs related to handover events.

Handover is a process in which a user equipment (UE)-cell association changes so that their connectivity is maintained while the UE moves through different cells. The number of handovers depends on various factors such as the distribution and location of cells, speed and trajectory of mobile users, reference signal received power (RSRP) variations, reference signal received quality (RSRQ) variations, handover mechanism, etc. Metrics indicative of the impact of one cell on another (e.g., handover success/attempts rate, cell reselection and/or beam reselection rate, signal strength relationship between neighboring cells and/or other parameters related to the channel interference between the cells) are referred to collectively hereinafter as channel interference KPIs (CI KPIs).

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 illustrates an exemplified schematic diagram of a network simulated in accordance with the presently disclosed subject matter.

FIG. 7 illustrates Path Loss models as defined by Third Generation Partnership Project (3GPP) Technical Report (TR) 38.901 version 14.0.0 Release 14.

DETAILED DESCRIPTION

Figure 1:
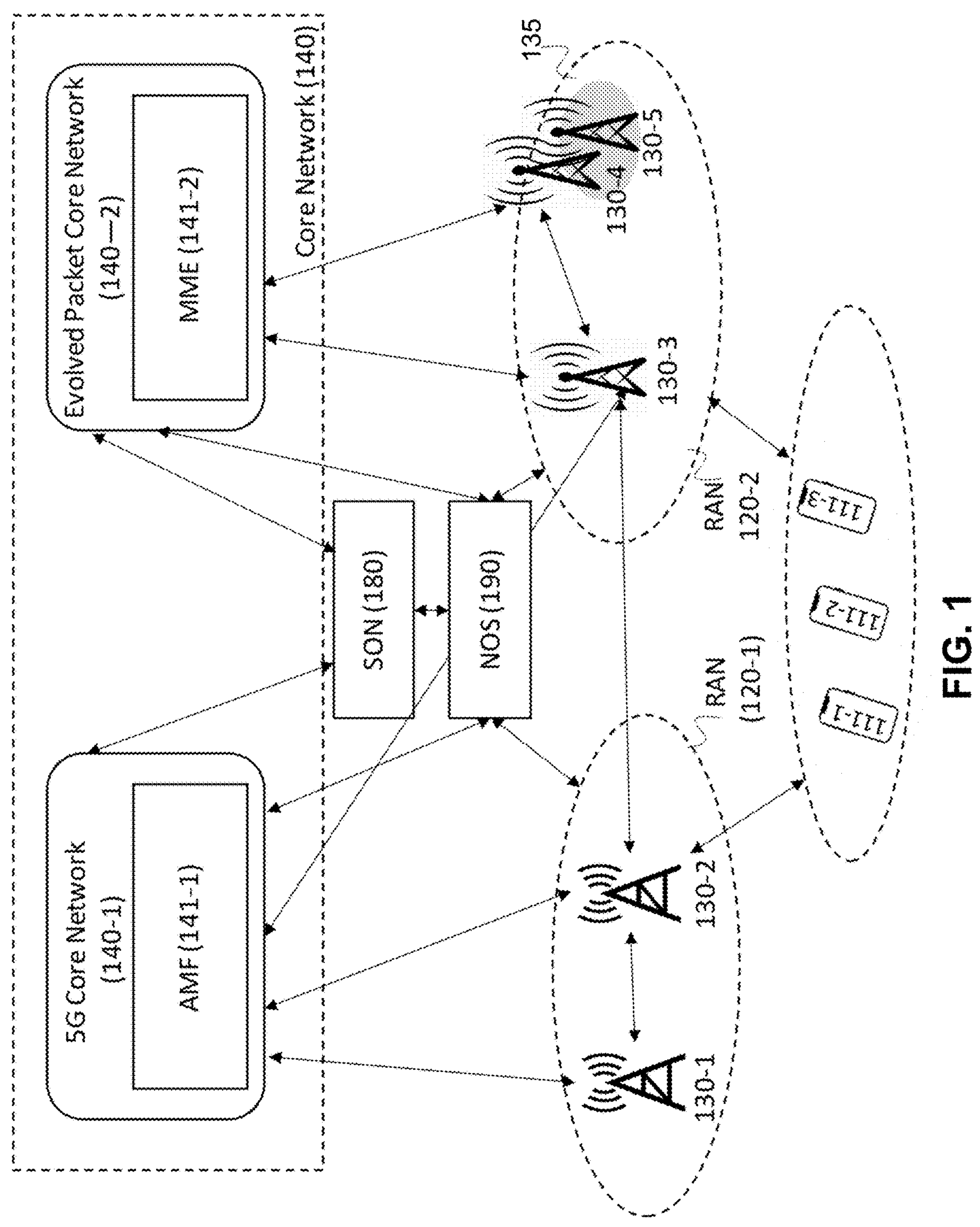
FIG. 1 illustrates exemplified generalized cellular network environments including a network optimization (NO) system configured in accordance with the presently disclosed subject matter.

Mobile network operators plan, optimize, and maintain network performance. The network performance can be assessed with the help of quantifiable performance metrics known as key performance indicators (KPIs). A KPI is a value, such as a counter value, a ratio, or the like, that indicates a performance metric. Among such KPIs are KPIs related to channel interference (CI), sometimes referred to as CI KPIs and described in more detail elsewhere herein. CI is interference occurring between two or more cells, such as due to transmissions or receptions associated with a first cell impacting transmissions or receptions associated with a second cell. In some examples, a KPI may be based on a counter. For example, a wireless communication specification may define a counter that can be applied in a cellular network (e.g., a counter based on a number of failed transmissions, a number of attempts to transmit a message, a number of failures to receive a signal), and may define a KPI based on the counter.

Network planning involves the configuration and operation of network nodes, such as base stations providing cells for access to the network, based on (e.g., to optimize) performance according to one or more metrics (e.g., one or more KPIs). Furthermore, in some examples, reconfiguration or optimization may be performed "on the fly" during operation of a network. Reconfiguration or optimization of a network may benefit from accurate prediction of the effect of a reconfiguration action of a cell (e.g., a change in a cell's location, a change in an antenna's configuration, a change in bandwidth, a change in transmission power, and so on) on neighboring cells of the cell. A standards development organization (e.g., the Third Generation Partnership Project (3GPP)) may provide predefined models that assist in identifying the effect of a reconfiguration action, such as by modeling radio propagation between a cell and a neighbor cell or a UE associated with the cell or the neighbor cell in order to identify CI between the cell and the neighbor cell. However, directly applying these predefined models in a network during operation of the network (e.g., for reconfiguration or optimization on the fly) may involve significant processing resource usage, thereby increasing processing burden and introducing delay in the reconfiguration or optimization of the network.

Some techniques described herein provide training and usage of a model, such as a machine learning model, to predict a CI indicator, such as a CI KPI. For example, a network node may generate models of a plurality of cellular networks. The network node may simulate radio propagation (e.g., using a predefined model for path loss, antenna coverage, or the like) for a number of UEs of a model of a cellular network, of the models of the plurality of cellular networks. The network node may define, for one or more pairs of cells of the cellular network, one or more CI indicators based at least in part on the simulated radio propagation. The network node may generate a training set including one or more training samples informative of association between data characterizing a given cell and one or more neighbor cells of the given cell, and one or more values of the one or more CI indicators for one or more cells pairs including the given cell and the one or more neighbor cells of the given cell. In some aspects, the network node may train a machine learning model using the training set. The machine learning model may output one or more CI indicators based on input data characterizing a set of cells. In some aspects, the network node may simulate the radio propagation (e.g., using the model for path loss, antenna coverage, or the like) offline, such as separately from a reconfiguration or optimization operation, or separately from usage of the machine learning model to reconfigure the network. Thus, the benefits of modeling radio propagation using accurate models (such as may be provided by a standards development organization), including accurate prediction of path loss and other radio propagation characteristics in a simulated cellular network, are achieved without incurring the processing resource usage of directly applying such models for determination of CI indicators. For example, by operating the machine learning model for determination of CI indicators to reconfigure or optimize a network, processing resource usage is reduced relative to modeling radio propagation using the models for path loss, antenna coverage, or the like, described above. Thus, delay in on-the-fly network management and planning is reduced and efficiency of resource usage is improved.

In some examples, a network node, when simulating the radio propagation, may generate multiple models of cellular networks (e.g., a large number of models, as described elsewhere herein). These multiple models may have different distributions of cells, different parameters, different densities, or the like. The network node may simulate the radio propagation for each of the multiple models, and/or may train the machine learning model based on a training set derived from simulating the radio propagation for each of the multiple models. Thus, versatility of the machine learning model is improved, and the benefits of applying predefined models for path loss, antenna coverage, or the like to determine radio propagation are achieved while reducing processor usage relative to directly applying such models for reconfiguration or optimization of the network.

In the following detailed description, numerous specific details are set forth in order to provide a thorough understanding of the techniques described herein. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "simulating", "providing", "applying", "obtaining" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the network optimization system (NOS) disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Bearing this in mind, attention is drawn to FIG. 1 illustrating a non-limiting example of a cellular network environment including a NOS 190 configured in accordance with certain embodiments of the presently disclosed subject matter.

The illustrated exemplified network environment comprises one or more radio access networks (RANs) denoted as RAN 120-1 and RAN 120-2. Each RAN comprises a plurality of base stations (denoted as base stations 130-1-130-5) operating in accordance with respective cellular standards. The base stations can operate in different bands and/or radio access technologies (RATs) and can be provided by different vendors. A given base station (e.g., an Evolved Universal Terrestrial Radio Access Network (E-UTRAN) Node B, evolved Node B, eNodeB, eNB, Next Generation Evolved Node B, Next Generation Node B, gNode B, gNB, etc.) can be implemented as a macrocell, microcell, small cell, picocell, or the like, or as any appropriate combination or future evolution thereof. In some examples, a base station may be a disaggregated base station, which may include a central unit, one or more distributed units, and/or one or more radio units, as described in more detail in connection with FIG. 8.

The base stations 130 serve a plurality of user equipment (UEs) (denoted UEs 111-1-111-3), which may be in operating modes or in idle modes. The UEs are configured to communicate with the base stations (e.g., cells) via radio frequency (RF) channels allowing bidirectional transmission of voice and/or data between the cells and UEs in accordance with respective cellular standards. A base station serving a UE may provide connectivity to the RAN 120 via a cell provided by the base station (e.g., a radio unit of the base station). In the illustrated example, RAN 120-2 is an E-UTRAN RAN, and RAN 120-1 is a 5G NR RAN.

The one or more RANs are associated with (e.g., operatively connected to) a core network 140 that can comprise one or more core networks of different types. In the illustrated exemplified network environment, core network 140 comprises a 5th-Generation Core (5GC) network 140-1 and an Evolved Packet Core (EPC) network 140-2. Base stations 130-1 and 130-2 belong to 5G NR RAN 120-1 and are operatively connected to the 5GC 140-1 through an NG2 interface for control-plane signaling and using an NG3 interface for user-plane data communications. Base stations 130-3-130-5 belong to E-UTRAN 120-2 and are operatively connected to the EPC 140-2 using an SI interface for control-plane signaling and user-plane data communications. Some of the base stations in E-UTRAN 120-2 (e.g. base station 130-3) can be associated with both the 5GC and EPC core networks. A base station that can be connected to both the 5GC and the EPC core network may be referred to hereinafter as a 5G-4G anchor node. In addition to communicating with core networks 140, the base stations can communicate with each other using cellular protocols, such as via a backhaul communication link.

The core network 5GC 140-1 includes an access and mobility management function (AMF) 141-1, which provides control-plane functions (e.g. registration and authentication of multiple UEs, authorization, mobility management, etc.) in the 5G NR network. The core network EPC 140-2 includes a Mobility Management Entity (MME) 141-2, which provides control-plane functions (e.g. registration and authentication of multiple UEs, authorization, mobility management, etc.) in the E-UTRAN network. AMF 141-1 and MME 141-2 communicate with the base stations in the RANs and can also communicate with a UE via a base station. A core network can also include various other functions or entities.

The network environment can also comprise a self-organizing network (SON) system 180 associated with (e.g., operatively connected to) AMF 141-1 and/or MME 141-2 (or at least partly integrated with AMF 141-1 and/or MME 141-2). SON system 180 can be further be associated with (e.g., operatively connected) to BSs 130-1-130-5. SON system 180 can be configured to enable or configure corrective actions (e.g., self-configuring, self-optimizing, self-healing, etc.) with regard to one or more BSs based on data related to the network environment and obtained by the SON system.

A site of a cellular network may comprise one or more base stations (e.g. site 135 comprises base stations 130-4 and 130-5) connected to multiple directional antennas. In some examples, the directional antennas used in a cellular network are sector antennas having sector-shaped radiation patterns characterized by the direction that the antenna points to (this direction is referred to hereinafter as an azimuth) and frequency. Optionally, the directional antennas can have equal angular widths (e.g. each antenna covers a 120° sector) while radiated frequencies and the coverage area can be different. Optionally, in certain embodiments, the site can comprise an omni-directional antenna which radiates equal radio power in all directions. In some examples, a site may comprise an antenna capable of beamforming, which improves gain relative to omni-directional antennas or sector antennas.

A site of a cellular network can be characterized by one or more cells that the site is associated with. Unless specifically stated otherwise, the term "cell" refers to a logical object defined as a combination of various carrier frequencies within a sector (e.g., coverage area). For example, the term "cell" may refer to a logical communication entity used for communication by a UE with a base station (e.g., over a carrier), and may be associated with an identifier for distinguishing neighboring cells (e.g., a physical cell identifier (PCID), a virtual cell identifier (VCID)) operating via the same or a different carrier. In some examples, the cells may support different service and/or device types (e.g., machine-type communication (MTC), narrowband Internet-of-Things (NB-IoT), enhanced mobile broadband (eMBB), ultra-reliable low-latency (URLLC) communications, and others). In some cases, the term "cell" may refer to a portion of a geographic coverage area (e.g., a sector) over which the logical entity operates.

The network environment further comprises a NOS 190. In some aspects, the NOS can be a stand-alone system associated with (e.g., operatively connected to) AMF 141-1 and/or MME 141-2. In some aspects, the SON system can be, at least partly, integrated with one or more servers of a core network and/or with SON system 180. As will be further detailed with reference to FIGS. 2-6, NOS 190 is configured to generate and/or use a machine learning model to estimate predicted CI indicators, such as CI KPI(s), of a plurality of cell pairs. These predicted CI indicators can be usable by AMF 141-1, MME 141-2, SON system 180, and/or one or more network nodes of a disaggregated base station, for optimization of the network environment. A predicted CI indicator may indicate a metric indicative of the impact of one cell on another cell (e.g., handover success/attempts rate, cell reselection and/or beam reselection rate, signal strength relationship between neighboring cells and/or other parameters related to the channel interference between the cells).

Those versed in the art will readily appreciate that the teachings of the presently disclosed subject matter are not bound by the network environment illustrated in FIG. 1 and can be implemented in other network architectures and/or standards.

Figure 2:
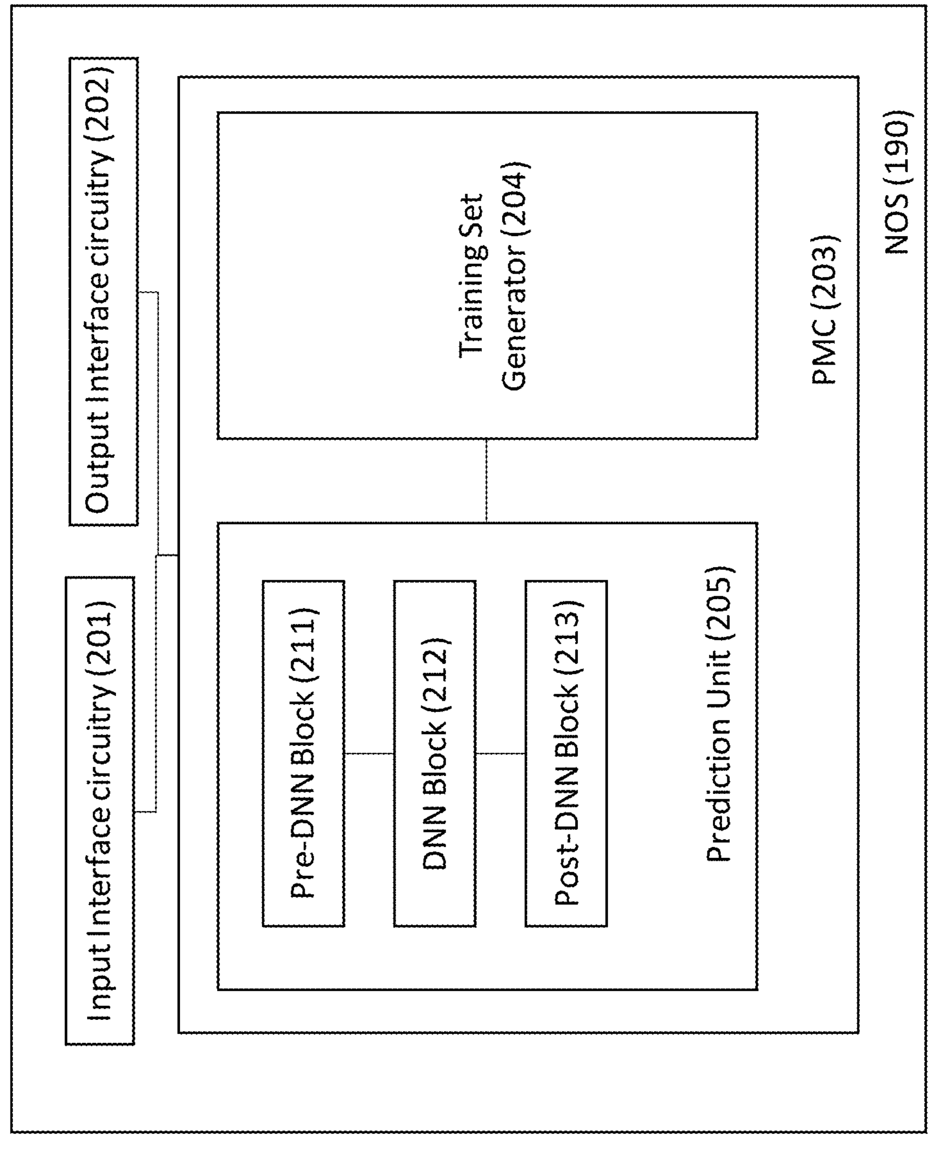
FIG. 2 illustrates a generalized block diagram of the NO system in accordance with the presently disclosed subject matter.

Referring to FIG. 2, there is illustrated a generalized block diagram of NOS system 190 in accordance with certain embodiments of the presently disclosed subject matter. NOS comprises processing and memory circuitry (PMC) 203 operatively connected to input interface circuitry 201 (e.g. one or more ports) and output interface circuitry 202 (e.g. one or more ports). NOS can further comprise a graphical user interface enabling user-specified inputs related to its operating.

Input interface circuitry 201 is configured to enable data communication for receiving data associated with cells (e.g., input data, data regarding performance, data regarding physical attributes, data regarding neighbors, etc.). In some aspects, physical attributes of a given cell are defined by the site the given cell is associated with and by an antenna providing a carrier of the given cell, as described elsewhere herein.

Input interface circuitry 201 provides the received data and/or derivatives thereof to PMC 203. PMC 203 comprises a processor coupled (e.g., operatively connected) to a memory. PMC 203 is configured to provide processing of the received and/or stored data in accordance with the operations further detailed with reference to FIGS. 3-6. Output interface circuitry 202 is configured to forward the results of the processing to one or more network entities (e.g. AMF 141-1 and/or MME 141-2 and/or SON system 180).

The processor of PMC 203 can be configured to execute several functional blocks in accordance with computer-readable instructions implemented on a non-transitory computer-readable memory comprised in PMC 203. Such functional blocks are referred to hereinafter as comprised in the PMC 203. For example, the PMC 203 may include a memory and one or more processors. The one or more processors may be configured to perform operations described with reference to FIGS. 3-6.

PMC 203 may include prediction unit 205, which may be operatively connected to training set generator 204. As will be further detailed with reference to FIGS. 3-7, prediction unit 205 comprises a machine learning model that is configured, upon training, to automatically predict one or more CI KPIs of a cell pair using data informative of the cells of the cell pair. As will be further detailed with reference to FIGS. 5-6, training set generator 204 is configured to generate a training set (e.g., data) for training the machine learning model. Optionally, training set generator 204 can be implemented as a separate system (separate from NOS 190) configured to provide a generated training set to NOS 190 via input interface circuitry 201.

For purpose of illustration only, the following description of prediction unit 205 is provided for an embodiment implementing a machine learning model comprising a deep neural network (DNN). Those skilled in the art will readily appreciate that the teachings of the presently disclosed subject matter are applicable to other suitable supervised machine learning models (e.g., other generative models including non-linear networks, support vector machines (SVM), random forest engines, etc.).

The illustrated prediction unit 205 includes DNN block 212. The prediction unit 205 can further comprise pre-DNN block 211 configured to provide preprocessing (e.g. normalization) before forwarding input data to DNN block 212 and post-DNN block 213. Post-DNN block 213 may be configured to provide post-processing for data generated by DNN block 212.

As will be further detailed with reference to FIGS. 3-4, prediction unit 205 is configured to receive, via input interface circuitry 201, data informative of a given cell and one or more neighbors of the given cell (e.g., coordinates, physical attributes, carrier frequency, bandwidth, configuration, etc.). As used herein, "neighbor" may refer to a neighbor cell. In some use cases, prediction unit 205 can be further configured to receive data from one or more user plane elements (not shown in FIG. 1 for the simplicity of illustration) such as, for example, a user plane function (UPF) in a 5G network or a Serving/PDN gateway in a 4G network. Upon processing the received data (optionally together with other data such as, for example, a network context, etc.), for example, using a machine learning model, prediction unit 205 generates one or more CI KPIs related to the given cell and usable by AMF 141-1 and/or MME 141-2 and/or SON system 180 (or another network node) for planning, configuration, or optimization of the network environment. Prediction unit 205 can provide the results (that is, the one or more CI KPIs) via output interface circuitry 202. A network node (such as AMF 141-1, MME 141-2, SON system 180, or a network node of a disaggregated base station) may configure a network (e.g., a cell of a network, a site of a network, a network node of a network) based on the one or more CI KPIs, as described below.

DNN block 212 can comprise at least one DNN network comprising a plurality of layers organized in accordance with a DNN architecture. For example, DNN can comprise a DNN input layer, an output layer, and one or more hidden layers disposed between the input layer and the output layer. It is noted that the teachings of the presently disclosed subject matter are not bound by the number of hidden layers and/or by DNN architecture. By way of non-limiting example, the layers in DNN can be convolutional, fully connected, locally connected, pooling/subsampling, recurrent, etc.

Each layer of DNN block 212 can include multiple computational elements (CE) typically referred to in the art as dimensions, neurons, or nodes. CEs of a given layer can be connected with CEs of a preceding layer and/or a subsequent layer. Each connection between a CE of a preceding layer and a CE of a given layer, or a CE of a given layer and a CE of a subsequent layer, is associated with a weighting value. A given CE can receive inputs from CEs of a preceding layer via connections between the given CE and the CEs of the preceding layer, each connection being associated with a weighting value which can be applied to the input of the connection. The weighting values can determine the relative strength of the connections and thus the relative influence of the respective inputs of a given CE on the outputs of the given CE. The given CE can be configured to compute an activation value (e.g., the weighted sum of the inputs) and derive an output by applying an activation function to the computed activation value. The activation function can be, for example, an identity function, a deterministic function (e.g., linear, sigmoid, threshold, or the like), a stochastic function, or another function. The output from the given CE can be transmitted to one or more CEs of a subsequent layer via respective connections with the CEs of the subsequent layer. Each connection at the output of a CE can be associated with a weighting value which can be applied to the output of the CE prior to being received as an input of a CE of a subsequent layer. Further to the weighting values, there can be threshold values (including limiting functions) associated with the connections and CEs.

In some examples, the weighting and/or threshold values of a DNN can be initially selected prior to training, and can be further iteratively adjusted or modified, which is referred to as training of the DNN. Training may be performed using a training set of data. Training may aim to achieve an improved (e.g., optimal) set of weighting and/or threshold values in the DNN. Training may involve a number of iterations. After each iteration of training, a difference can be determined between an actual output produced by the DNN and a target output identified by the training set of data. The difference can be referred to as an error value. The weighting and/or threshold values may be adjusted based on the difference, such as to reduce the error value. Training can be determined to be complete when a cost function indicative of the error value is lower than a predetermined value, or when a limited change (e.g., lower than a threshold) in performance between iterations is achieved.

A set of DNN input data used to train the DNN (e.g., adjust the weights/thresholds of the DNN) is referred to hereinafter as a training set. The training set can be generated by training set generator 204 and/or received via input interface circuitry 201. The training set may identify CI indicators for a given cell and one or more neighbor cells (e.g., a desired output of the DNN) and data characterizing the given cell and the one or more neighbor cells. Thus, the data characterizing the given cell and the one or more neighbor cells can be inputted to the DNN, and the output of the DNN (e.g., a predicted CI indicator) can be compared to the CI indicators identified by the training set in order to identify the error value. It should be noted that the training set can include data and CI indicators regarding a large number of cells and cellular networks, based on simulation of radio propagation in a number of generated cellular network deployments, as described in more detail below.

Inputs to prediction unit 205 can be pre-processed by pre-DNN block 211 prior to inputting to DNN block 212, and/or outputs of DNN block 212 can be post-processed by post-DNN block 215 before outputting from prediction unit 205.

Those skilled in the art will readily appreciate that the presently disclosed subject matter is not bound by the NOS illustrated in FIG. 2. Equivalent and/or modified functionality can be consolidated or divided in another manner and can be implemented in any appropriate combination of software with firmware and hardware. In some aspects, training set generator 204 can be implemented as one or more standalone entities operating in conjunction with the NOS 190. In some aspects, training set generator 204 can be integrated, fully or partly, with other network entities. Optionally, at least part of the functionality of NOS 190 can be implemented in a cloud and/or distributed arrangement.

Figure 3:
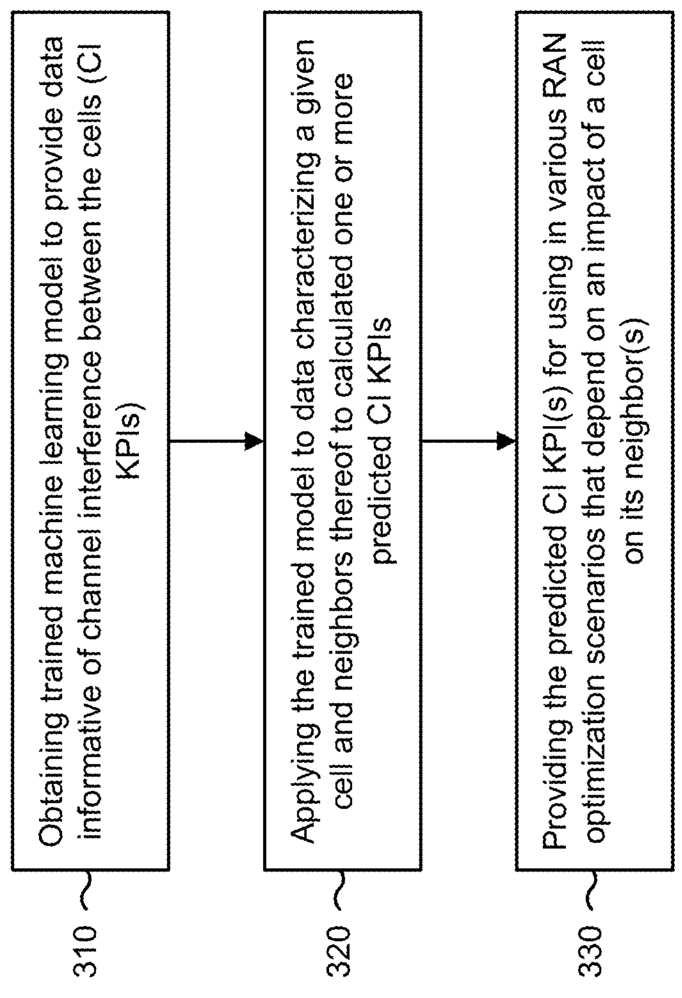
FIG. 3 illustrates a generalized flow-chart of operating the NO system in accordance with the presently disclosed subject matter.

FIG. 3 illustrates an example flow-chart of operating a NOS (e.g., NOS 190). The NOS may obtain (310) a machine learning model trained to provide CI indicators (e.g., CI KPIs) informative of channel interference between cells of a cellular network. In some aspects, the machine learning model may comprise a DNN, as described with regard to FIG. 2. In some aspects, the machine learning model may comprise another form of model. A machine learning model is a model trained, at least in part, using a machine learning algorithm.

The NOS may apply the model to calculate (320), for one or more cells of interest, one or more CI indicators (e.g., CI KPIs) for one or more pairs including the one or more cells of interest (where a pair includes the cell of interest and another cell). A cell of interest is a cell for which a CI indicator (regarding a cell pair including the cell of interest) is calculated. The NOS uses data characterizing a given cell and one or more neighbors of the given cell as inputs to the machine learning model. The NOS may further provide (330) the predicted CI indicators (e.g., predicted CI KPI(s)) (and/or derivatives thereof) to one or more network nodes (e.g., AMF 141-1 and/or MME 141-2 and/or SON system 180 and/or user plane elements, etc.). In some examples, the CI indicators KPI(s) are usable for various use cases, such as RAN planning, configuration, or optimization, as described elsewhere herein.

The machine learning model can be trained using supervised learning using a simulated training set detailed with reference to FIGS. 5 and 6, or a training set comprising a mix of simulated data and measured data. In some aspects, the measured data may relate to a cellular network for which the machine learning model has previously predicted one or more CI indicators. For example, a network node may configure a cellular network based on a predicted CI indicator. The network node may obtain a CI measurement for the cellular network after performing the configuration. The network node may train the machine learning model (or may provide the CI measurement for training of the machine learning model) based on the CI measurement. For example, the network node may update a weighting value or a threshold value of the machine learning model using a machine learning algorithm (e.g., based on comparing the CI measurement to the predicted CI indicator).

In some aspects, input data characterizing a given cell (and/or one or more neighbors of the given cell) can include information indicating latitude of a cell, longitude of a cell, an azimuth (e.g., a facing azimuth) of an antenna, a height of an antenna, a tilt of an antenna, a beam configuration of an antenna, a carrier frequency, a bandwidth (e.g., an operating bandwidth), a transmission (Tx) power, or other information. In some aspects, the input data may indicate an antenna type of an antenna (e.g., omni-directional, sector antenna, beamforming antenna, massive MIMO antenna), a type of a site associated with the cell (e.g., macro, micro, pico, femto, etc.), or the like.

Output data (in some examples, predicted CI KPIs) may be calculated for all cells of interest (e.g., for each pair including a cell of the cells of interest). For example, the machine learning model may output the output data based on the input data. In some aspects, a cell of interest may be selected based on one or more criteria. The one or more criteria may include, for example, a location of a cell (e.g., all cells associated with a location, a cell covering a location, all cells included in an area, etc.), a RAT (e.g., all 5G cells, all E-UTRA cells), a bandwidth (e.g., all cells using a particular operating bandwidth, all cells operating on a given band), a cell type, or the like. In some aspects, the one or more criteria may be based on (e.g., depend on) a use case. A use case may indicate an action to be performed based on the output data. In some aspects, the NOS may select cells of interest based on a use case. For example, the NOS may identify (e.g., based on user input, information regarding operation of a cellular network, or the like), a use case, such as an automatic neighbor relation use case or another use case as described below. The NOS may use one or more criteria associated with the use case to identify one or more cells of interest. The NOS may input data characterizing the one or more cells of interest (and/or neighbor cells of the one or more cells of interest) to the machine learning model. The machine learning model may output one or more CI indicators regarding the one or more cells of interest. The one or more CI indicators may be used (by the NOS or another network node) to perform an action associated with the use case, such as adding or removing a cell as a neighbor cell of a cell of interest in the case of automatic neighbor relation.

In some aspects, a cell pair (e.g., a pair of cells to which a CI indicator relates) may include an intra-frequency pair (e.g., a pair of cells associated with a same operating frequency). In some aspects, a cell pair may include an inter-frequency pairs (e.g., a pair of cells associated with different operating frequencies). In some aspects, a cell pair may include an intra-RAN pair (e.g., a pair of cells associated with a same RAN, a pair of cells associated with a same public land mobile network, or a pair of cells associated with a same RAT). In some aspects, a cell pair may include an inter-RAN pair (e.g., a pair of cells associated with different RANs, a pair of cells associated with different public land mobile networks, or a pair of cells associated with different RATs). In some aspects, a pair of cells may include a cell of an E-UTRAN RAN and a cell of a 5G NR RAN).

In some examples, for each cell pair (e.g., each cell pair including a cell of interest), a predicted CI KPI can indicate (e.g., be informative of) a score (e.g. between 0 and 100). The score may indicate an impact of cells within a cell pair, wherein a higher score means that the cells in a pair have higher impact between one another. For example, a score of 50 indicates that the machine learning model predicts that half of UEs serving by one cell will be impacted by another cell in the pair. Thus, the score may indicate a quantity of UEs, associated with a given cell, predicted to be impacted by one or more neighbor cells of the given cell. Other examples of a predicted CI KPI include a predicted interference strength, a predicted number of handovers, a predicted rate of radio link failure, or the like. By way of non-limiting example, the impact can be indicative of a statistical probability of handover from a service cell to a target cell and/or backward, an expected maximal or average value of received (Rx) power of a serving cell and/or a target cell, etc.

In some examples, prediction unit 205 (e.g. post-DNN block 213) can use the calculated CI indicators (e.g., CI KPIs) of the cells of interest to generate a score matrix. A score matrix may indicate cells of interest, or cell pairs, and corresponding scores of the cells of interest or cell pairs. Alternatively or additionally, prediction unit 205 can use the calculated CI KPIs of the pairs of interest to calculate statistical characteristics (e.g. average, maximum, minimum, variance) of impact associated with the cells of interest or cell pairs. Additionally, or alternatively, prediction unit 205 can use the calculated CI indicators (e.g., CI KPIs) of the cells of interest or cell pairs to define one or more cell pairs with CI indicators (e.g., CI KPIs) meeting one or more criteria (e.g. the highest impact between the neighbors), etc.

As mentioned above, a network node (e.g., AMF 141-1 and/or MME 141-2 and/or SON system 180, or another network node) may configure a cellular network (e.g., one or more cells of the cellular network) based on predicted CI indicators (e.g., CI KPIs). In some aspects, a network node may configure a cellular network according to a use case. Examples of use cases, and description of how a predicted CI indicator can be used to configure a cellular network in a use case, are provided below.

A network node (e.g., AMF 141-1, MME 141-2, SON system 180, or another network node) may configure a cellular network (e.g., one or more cells of the cellular network) based on one or more predicted CI indicators (e.g., CI KPIs). For example, the network node may optimize the cellular network, plan the cellular network, reconfigure the cellular network, or the like. A configuration action may be associated with a use case. For example, a use case may indicate how a CI indicator can be used to identify a configuration action to be performed by the network node. Examples of use cases and corresponding configuration actions are provided below.

In some aspects, a network node may perform automatic neighbor relation (ANR). In ANR, a given cell is configured (e.g., self-configured or configured by a SON 180) with a list of neighbor cells. This list of neighbor cells can be used for various purposes, such as active-mode mobility, load balancing, and dual-connectivity. A network node may configure a cell in association with ANR based on a CI indicator. For example, the network node may add a cell as a neighbor cell of a given cell based on a score indicated by a predicted CI indicator of the cell and the neighbor cell satisfying a criterion (e.g. subject to a certain location, add all cells belonging to cell pairs with scores higher than a predefined threshold, or add a number of cells (e.g., N cells) belonging to cell pairs with highest scores of a plurality of cell pairs, etc.). As another example, the network node may remove a cell, as a neighbor cell, based on a score of a pair, including the cell, failing to satisfy a threshold.

In some aspects, a network node may configure a cell as an anchor, such as a 5G-4G anchor node. In some aspects, an anchor is a cell on which control plane signaling is performed in a non-standalone configuration. In some aspects, a 5G-4G anchor is a network node that can be connected to both the 5G core network and the 4G core network. For example, a 5G-4G anchor node may provide non-standalone service. In some aspects, the network node may add a cell as a 5G-4G anchor node based on a score (indicated by a predicted CI indication) of a pair of cells (e.g., a 5G-4G pair) including the cell satisfying a threshold. For example, the network node may add one or more cells, from one or more cell pairs that have scores higher than a threshold, as a 5G-4G anchor node, or may add a number of cells (e.g., N cells) associated with cell pairs with highest scores of a plurality of cell pairs.

In some aspects, a network node may configure a physical cell identifier (PCI) based on a predicted CI indication. A PCI is a physical layer identifier a cell. A PCI may be used to generate certain synchronization signals, such as a primary synchronization signal (PSS), and to identify a resource allocation of the PSS. PCIs of cells may be configured to reduce collision between different cells, for example, using a PCI MOD(3), PCI MOD(6), or PCI MOD(30) technique in which resource allocations of reference signals or synchronization signals are varied based on a modulo operation on a PCI. The network node may exclude, from a PCI MOD(3), PCI MOD(6), or PCI MOD (30) collision scheme, a cell pair with a CI indicator (e.g., a score) satisfying a threshold, thereby reducing interference between cells.

In some aspects, a network node may configure a root sequence index (RSI) based on a predicted CI indication. For example a network node can configure, for a cell, an RSI used to derive a physical random access (PRACH) preamble sequence. An RSI overlapping scheme may provide for reuse of one or more RSIs, such that different cells can be configured with the same RSI, thereby reducing the number of RSIs to be implemented. However, two or more cells in close proximity, configured with the same RSI, may experience collisions, leading to CI. The network node may exclude, from an RSI overlapping scheme, a cell pair with a CI indicator (e.g., a score) that satisfies a threshold. Thus, collision between PRACH preamble sequences of the cell pair can be avoided.

In some aspects, a network node may configure an antenna based on a predicted CI indication. For example, a network node may perform coverage and capacity optimization (CCO). In some aspects, a network node may adjust a physical characteristic of an antenna, such as a tilt, an azimuth, a beamwidth, a transmit power, or the like, based on the predicted CI indication. For example, the network node may reduce a tilt (such that the antenna's coverage area is directed toward the ground, thereby reducing the antenna's coverage area) based on the predicted CI indication indicating a threshold level of interference with another cell.

In some aspects, a network node may perform load balancing based on a predicted CI indication. For example, a network node may configure a load balancing parameter of a cell based on a predicted CI indication of the cell. For example, the network node may configure the load balancing parameter such that a number of UEs are transferred away from the cell if the predicted CI indication satisfies a threshold. Thus, interference at the number of UEs is reduced.

In some aspects, a network node may perform self-healing of a cellular network based on a predicted CI indication. For example, self-healing may involve a compensation operation, in which a cellular network is reconfigured such that coverage for a problematic cell (e.g., a cell associated with a threshold level of CI, a cell associated with an outage) is provided by another cell or network node. For example, parameters of nearby cells may be adjusted to recover the service of UEs covered by the problematic cell. In some aspects, the network node may perform a compensation operation for a cell based on a predicted CI indication associated with the cell satisfying a threshold. For example, the network node may reconfigure parameters of one or more neighbor cells of the cell based on the predicted CI indication associated with the cell satisfying the threshold (that is, based on the cell being associated with a threshold level of self-interference.

In some aspects, a network node may perform network planning based on one or more predicted CI indicators. For example, the network node may identify a placement of one or more cells based on the one or more predicted CI indicators. For example, the network node may identify a placement that minimizes interference with one or more neighbor cells of the cell according to the one or more predicted CI indicators.

In some aspects, a network node may perform network planning for an earth station. For example, an earth station may receive transmissions, such as transmissions from a satellite on a frequency band including 3.7 GHz-4.2 GHz (e.g., the "C-band"). The C-band has traditionally been used for downlink satellite transmissions to earth stations. However, in 5G, at least part of the C-band is being repurposed for 5G communication. To ensure that the 5G network is properly deployed without undue interference, a "safe zone" may be provided around an earth station. Thus, a 5G cell or a site providing a 5G cell supporting the C-band is not deployed sufficiently close to a C-band earth station to cause interference with the earth station or the cell, which prevents interference on the downlink and/or interference at the cell/site. The network node may identify a placement of one or more cells or sites to conform with the safe zone while optimizing a network parameter (e.g., minimizing a predicted CI indicator). Thus, compliance for sites near earth stations is provided to assure safe rollout and operation of C-band cells while maintaining optimal network coverage.

Figure 4:
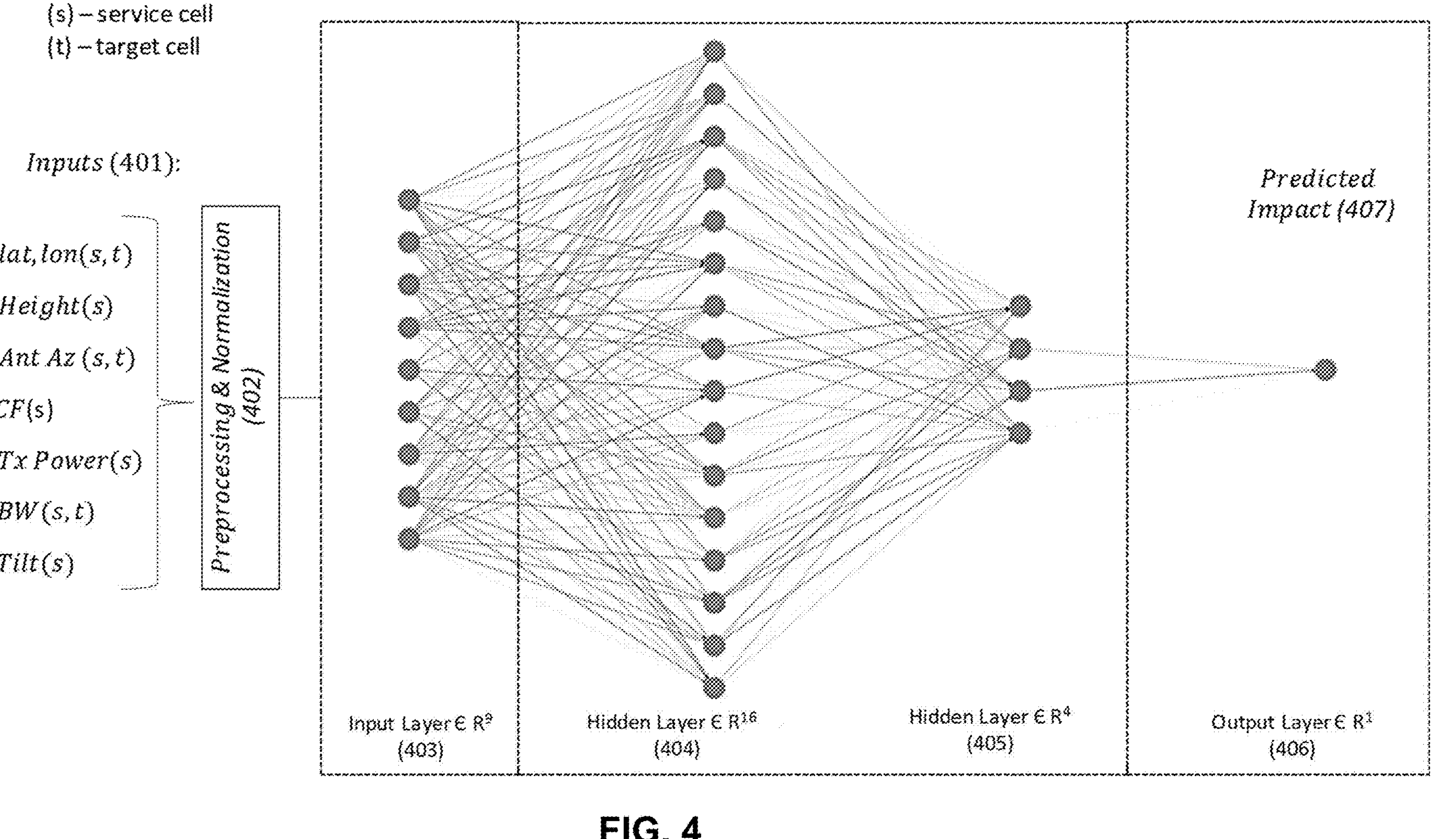
FIG. 4 illustrates a schematic diagram of non-limiting example of applying the trained machine learning model to obtain channel interference KPIs (CI KPIs) in accordance with of the presently disclosed subject matter.

FIG. 4 illustrates a schematic diagram of a non-limiting example of applying the trained machine learning model to obtain a CI indicator (e.g., a CI KPI) of a pair of cells (referred to hereinafter as a service cell and a target cell). The illustrated machine learning model is implemented as a DNN comprising an input layer (403), an output layer (406) and hidden layers (404, 405). The trained machine learning model may be used (e.g., applied) by a network node, such as a NOS, a SON system, an AMF, an MME, a central unit (CU) or distributed unit (DU) of a disaggregated RAN, or the like.

The input data (401) may include data informative of latitude and longitude, and antenna's facing azimuth of the service cell and the target cell. The input data may further include data informative of a height and tilt of a service antenna as well as carrier frequency, operating bandwidth and transmission power of the service cell. The output data is informative of predicted impact between the service and the target cells.

Optionally, the machine learning model can include two sub-models (e.g. two separate DNNs): a first sub-model trained for service cells operating in accordance with 4G protocols and a second sub-model trained for service cells operating in accordance with 5G protocols. Target cells in the first sub-model and the second sub-model can operate in accordance with 4G protocol or 5G protocol.

Input data can be preprocessed (e.g. by pre-DNN block 211) prior to use by the machine learning model. Preprocessing can include selecting a proper sub-model (such as the first sub-model or the second sub-model) in accordance with input data informative of operating bandwidth of a given service cell. Alternatively or additionally, preprocessing can include adjusting input data for the machine learning model. In some examples, during training of the machine learning model, a particular antenna type may be taken into account. For example, the machine learning model may be trained using an omni-directional antenna type taking into account antenna gain, horizontal antenna patterns, and vertical antenna patterns, in accordance with one or more predefined (e.g., 3GPP) models).

In some aspects, input data can be normalized (e.g. by pre-DNN block 211) prior to input to the machine learning model. By way of non-limiting example, the distances can be normalized to a range of 0-1.

Figure 5:
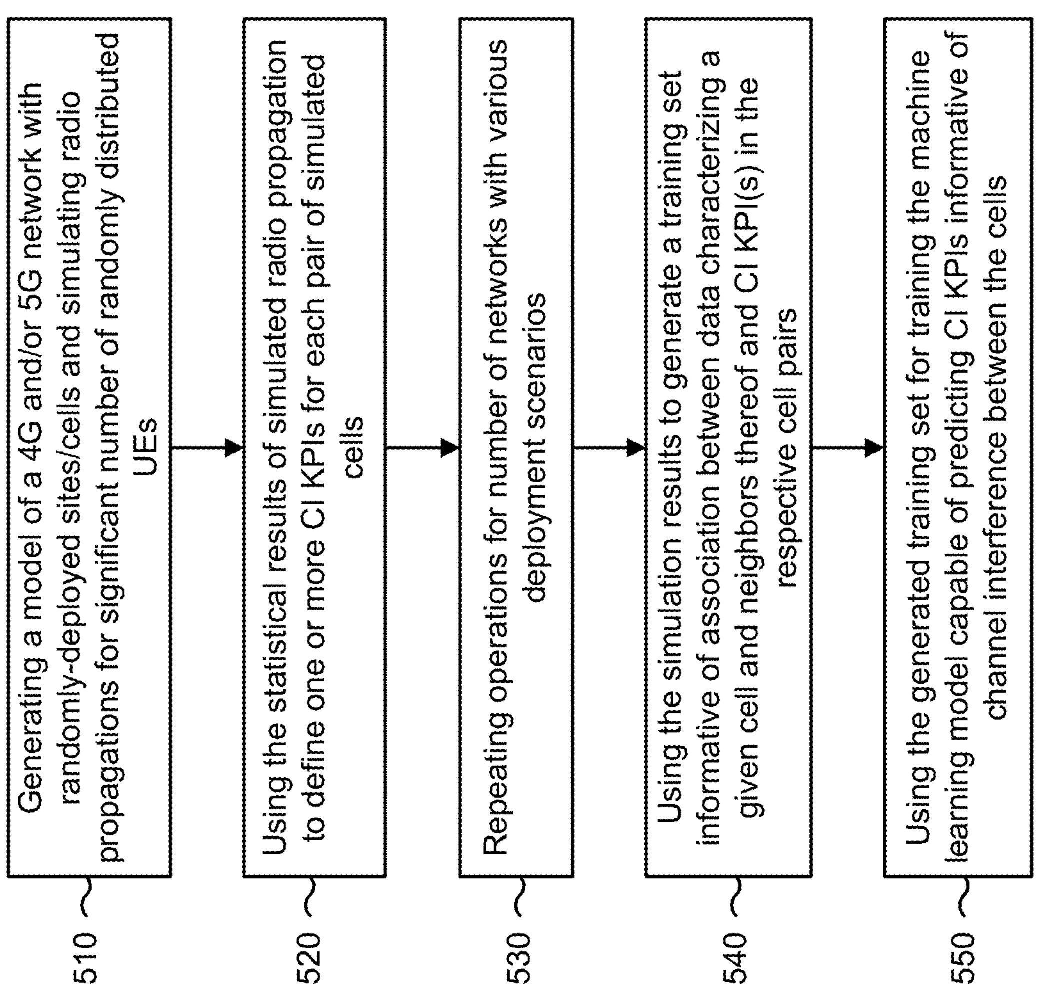
FIG. 5 illustrates a generalized flow-chart of generating a training set in accordance with the presently disclosed subject matter.

Referring to FIG. 5, there is illustrated a flow-chart of generating a training set in accordance with certain embodiments of the presently disclosed subject matter. The training set may be generated by a network node, such as a NOS, a SON system, or the like. Training set generator 204 generates (510) a model of a network (e.g., a 4G network and/or a 5G network) with deployed cells. In some aspects, the deployed cells are randomly distributed. In the present example, the deployed cells are characterized by location, height, antenna tilt, carrier frequency, operating bandwidth, transmission power and, optionally, one or more other configuration parameters or performance parameters.

By way of non-limiting example, the modelled network can comprise 100-200 cells randomly distributed in a fixed grid with randomly assigned "real-life" parameters. Cell coverage can be, for example, in a range of 500 m-10 km, and can be distributed randomly and/or in accordance with a pre-defined density (e.g., urban, railway, highway, suburban, rural, combinations thereof, etc.). In some examples, the network can serve a number of UEs. For example, the network may serve 100,000 or more randomly distributed UEs. An exemplified schematic diagram of a simulated network is illustrated in FIG. 6. A group of dots of the same type represent UEs served by a same cell.

In certain embodiments, network modelling can be provided with the help of 3GPP models (e.g., detailed in 3GPP TR 36.942 v12.0.0 (2014-09)). By way of non-limiting example, each site can be modelled as having three cells, each with antenna radiation pattern defined as:

$$A(\theta) = -\min\left[12\left(\frac{\theta}{\theta_{3dB}}\right)^2, A_m\right]$$

where $-180 \le \theta \le 180$, $\theta_{3\ dB}$ is the 3 dB beam width which corresponds to 65 degrees, and $A_{m'}$ =20 dB is the maximum attenuation.

Training set generator 204 simulates (502) radio propagation for all UEs in the model and obtains statistical results for each pair of the simulated cells.

By way of non-limiting example, path loss can be calculated in accordance with one or more 3GPP models. For 4G, service cell path loss can be defined as:

$L=40(1-4*10^{-3}*Dhb)\ \log_{10} R-18\ \log_{10} Dhb+21\ \log_{10} f+80$ [dB] where 21 log 10(f) is a frequency factor; R is the BS-UE separation in Km; and Dhb is the BS antenna height (in meters) measured from the average rooftop level (e.g. see 3GPP Technical Report (TR) 36.942 v12.0.0 (2014-09)). For 5G, service cell loss can be defined using path loss models for urban and rural scenarios, provided, for example, in Table 7.4.1-1 of 3GPP TR 38.901 v14.0.0 (2017-05), incorporated herein by reference and illustrated in FIG. 7.

The Line-Of-Sight (LOS) probabilities can be defined as following (see Table 7.4.2-1 of 3GPP TR 38.901 v14.0.0 (2017-05)):

$$P_{LOS} = \begin{cases} 1 & , d_{2D} \le 10m \\ \exp\left(-\frac{d_{2D}-10}{1000}\right) & , 10m < d_{2D} \end{cases}$$

A statistical result may include, for example, one or more LOS probabilities (e.g., LOS probabilities for a plurality of UEs associated with a cell pair), one or more path loss values (e.g., path loss values for a plurality of UEs associated with a cell pair), a number or ratio of UEs (associated with a cell pair) experiencing a receive power that satisfies a threshold, or the like. Training set generator 204 may use (503) the statistical results of simulated radio propagation (as determined using the above-described models) to define one or more CI KPIs for each pair of the simulated cells. For example, a CI KPI can be determined as a function of a path loss calculated between the service and the target cells for a plurality of served UEs. By way of non-limiting example, an allowed path loss range (e.g. 70-160 dB) can be normalized to impact score range values (e.g. 100-0). A score for a path loss value equal to or above 160 dB can be assumed as equal to zero.

The teachings of the presently disclosed subject matter are not bound by 3GPP models for path loss, antenna patterns, etc. and are applicable to other models suitable for calculating a degree of radio frequency coupling between the cells in 4G and/or 5G environment.

Training set generator 204 repeats (540) operations (510)-(530) for a number of networks (e.g., more than 10,000 networks, in some examples) with various deployment scenarios (e.g., different pre-defined densities, different RATs, different distributions of cells, or the like), and uses (550) the simulation results to generate a training set with training samples informative of association between data characterizing a given cell and neighbors thereof and CI KPI(s) in the respective cell pairs.

Training set generator 204 further uses (506) the generated training set to train the machine learning model capable of predicting CI KPIs informative of channel interference between the cells.

Performance testing of the trained DNN can be performed against a 3GPP model. By way of non-limiting example, testing can be done based on one or more metrics, including, for example, a mean absolute error (MAE) between a neural-network impact calculation and an impact calculation derived from a 3GPP model. Another example of a metric is a 3GPP calculated impact (that is, an impact calculated using a 3GPP model). A misdetect (false negative) and/or false alarm (false positive) probability may be calculated for all impact values satisfying a threshold (e.g., 50), and the misdetect or false alarm probability may be compared against the calculated impact from the 3GPP model. Training the machine learning model may include adjusting one or more weights or connections based on the MAE or the comparison of the calculated impact and the misdetect or false alarm probability.

The teachings of the presently disclosed subject matter are not bound by generating the training set for ML capable predicting CI KPIs and are applicable to generating training sets for predicting other KPIs characterizing the cellular networks.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a transmission reception point (TRP), or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more Cus, one or more Dus, one or more radio units (RUs), or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more Cus, one or more Dus, or one or more RUs). In some examples, a CU may be implemented within a network node, and one or more Dus may be co-located with the CU, or alternatively, may be geographically or virtually distributed throughout one or multiple other network nodes. The Dus may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 8:
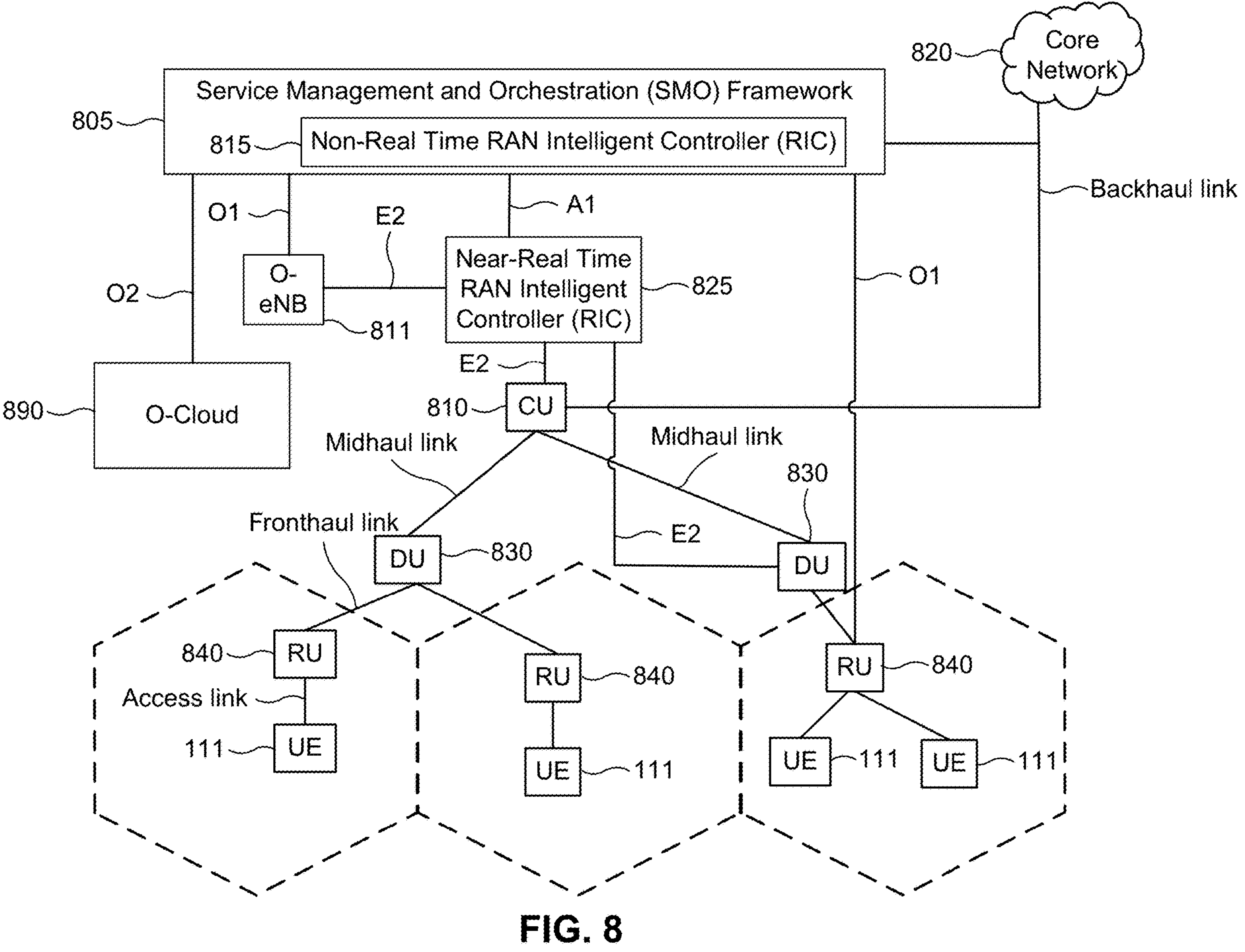
FIG. 8 is a diagram illustrating an example disaggregated base station architecture, in accordance with the presently disclosed subject matter.

FIG. 8 is a diagram illustrating an example disaggregated base station architecture 800, in accordance with the present disclosure. The disaggregated base station architecture 800 may include a CU 810 that can communicate directly with a core network 820 via a backhaul link, or indirectly with the core network 820 through one or more disaggregated control units (such as a Near-RT RIC 825 via an E2 link, or a Non-RT RIC 815 associated with a Service Management and Orchestration (SMO) Framework 805, or both). A CU 810 may communicate with one or more Dus 830 via respective midhaul links, such as through F1 interfaces. Each of the Dus 830 may communicate with one or more RUs 840 via respective fronthaul links. Each of the RUs 840 may communicate with one or more UEs 111 via respective RF access links. In some implementations, a UE 111 may be simultaneously served by multiple RUs 840.

Each of the units, including the Cus 810, the Dus 830, the RUs 840, as well as the Near-RT RICs 825, the Non-RT RICs 815, and the SMO Framework 805, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 810 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 810. The CU 810 may be configured to handle user plane functionality (for example, Central Unit-User Plane (CU-UP) functionality), control plane functionality (for example, Central Unit-Control Plane (CU-CP) functionality), or a combination thereof. In some implementations, the CU 810 can be logically split into one or more CU-UP units and one or more CU-CP units. A CU-UP unit can communicate bidirectionally with a CU-CP unit via an interface, such as the E1 interface when implemented in an O-RAN configuration. The CU 810 can be implemented to communicate with a DU 830, as necessary, for network control and signaling.

Each DU 830 may correspond to a logical unit that includes one or more base station functions to control the operation of one or more RUs 840. In some aspects, the DU 830 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 830 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 830, or with the control functions hosted by the CU 810.

Each RU 840 may implement lower-layer functionality. In some deployments, an RU 840, controlled by a DU 830, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 840 can be operated to handle over the air (OTA) communication with one or more UEs 111. In some implementations, real-time and non-real-time aspects of control and user plane communication with the RU(s) 840 can be controlled by the corresponding DU 830. In some scenarios, this configuration can enable each DU 830 and the CU 810 to be implemented in a cloud-based RAN architecture, such as a vRAN architecture.

The SMO Framework 805 may be configured to support RAN deployment and provisioning of non-virtualized and virtualized network elements. For non-virtualized network elements, the SMO Framework 805 may be configured to support the deployment of dedicated physical resources for RAN coverage requirements, which may be managed via an operations and maintenance interface (such as an O1 interface). For virtualized network elements, the SMO Framework 805 may be configured to interact with a cloud computing platform (such as an open cloud (O-Cloud) platform 890) to perform network element life cycle management (such as to instantiate virtualized network elements) via a cloud computing platform interface (such as an O2 interface). Such virtualized network elements can include, but are not limited to, Cus 810, Dus 830, RUs 840, non-RT RICs 815, and Near-RT RICs 825. In some implementations, the SMO Framework 805 can communicate with a hardware aspect of a 4G RAN, such as an open eNB (O-eNB) 811, via an O1 interface. Additionally, in some implementations, the SMO Framework 805 can communicate directly with each of one or more RUs 840 via a respective O1 interface. The SMO Framework 805 also may include a Non-RT RIC 815 configured to support functionality of the SMO Framework 805.

The Non-RT RIC 815 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 825. The Non-RT RIC 815 may be coupled to or communicate with (such as via an A1 interface) the Near-RT RIC 825. The Near-RT RIC 825 may be configured to include a logical function that enables near-real-time control and optimization of RAN elements and resources via data collection and actions over an interface (such as via an E2 interface) connecting one or more Cus 810, one or more Dus 830, or both, as well as an O-eNB, with the Near-RT RIC 825.

In some implementations, to generate AI/ML models to be deployed in the Near-RT RIC 825, the Non-RT RIC 815 may receive parameters or external enrichment information from external servers. Such information may be utilized by the Near-RT RIC 825 and may be received at the SMO Framework 805 or the Non-RT RIC 815 from non-network data sources or from network functions. In some examples, the Non-RT RIC 815 or the Near-RT RIC 825 may be configured to tune RAN behavior or performance. For example, the Non-RT RIC 815 may monitor long-term trends and patterns for performance and employ AI/ML models to perform corrective actions through the SMO Framework 805 (such as reconfiguration via an O1 interface) or via creation of RAN management policies (such as A1 interface policies).

As indicated above, FIG. 8 is provided as an example. Other examples may differ from what is described with regard to FIG. 8.

The aspects described herein are not limited in their application to the details set forth in the description contained herein or illustrated in the drawings. The aspects described herein are capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

The system according to the techniques described herein may be, at least partly, implemented on a suitably programmed computer. Likewise, the techniques described herein contemplate a computer program being readable by a computer for executing one or more methods described herein. The techniques described herein further contemplates a non-transitory computer-readable memory storing instructions executable by one or more processors for executing one or more methods described herein.

Those skilled in the art will readily appreciate that various modifications and changes can be applied to the embodiments of the present disclosure as hereinbefore described without departing from its scope, defined in and by the appended claims.

The following provides an overview of some Aspects of the present disclosure:

Aspect 1: A method performed by a network node, comprising: obtaining a machine learning (ML) model trained to provide one or more predicted channel interference (CI) indicators informative of channel interference between cells of a cellular network; calculating, using the ML model, the one or more predicted CI indicators using data characterizing a given cell and one or more neighbor cells of the given cell; and providing the one or more predicted CI indicators.

Aspect 2: The method of Aspect 1, wherein the one or more predicted CI indicators indicate an impact of the given cell on the one or more neighbor cells, or an impact of the one or more neighbor cells on the given cell.

Aspect 3: The method of Aspect 2, further comprising configuring a cellular network based at least in part on the one or more predicted CI indicators.

Aspect 4: The method of Aspect 3, wherein configuring the cellular network further comprises at least one of: adding or removing a cell as a neighbor cell of the given cell, adding or removing a cell as a 5G-4G anchor, performing physical cell identifier planning, performing root sequence index planning, performing coverage and capacity optimization, performing mobility load balancing, performing self-healing, or performing non-terrestrial network planning.

Aspect 5: The method of Aspect 3, wherein configuring the cellular network further comprises identifying a placement of a cell based at least in part on the one or more predicted CI indicators.

Aspect 6: The method of any of Aspects 1-5, further comprising selecting the given cell and the one or more neighbor cells as a set of cells of interest, wherein calculating, using the ML model, the one or more predicted CI indicators further comprises calculating the one or more predicted CI indicators for the given cell and the one or more neighbor cells based at least in part on the given cell and the one or more neighbor cells being the set of cells of interest.

Aspect 7: The method of Aspect 6, wherein selecting the given cell and the one or more neighbor cells as the set of cells of interest is based at last in part on a use case associated with configuring a cellular network including the given cell and the one or more neighbor cells.

Aspect 8: The method of any of Aspects 1-7, wherein calculating, using the ML model, the one or more predicted CI indicators further comprises calculating the one or more predicted CI indicators based at least in part on input data relating to the given cell and informative of at least one of: a latitude, a longitude, a facing azimuth of an antenna, a height of the antenna, a tilt of the antenna, a beam configuration of the antenna, a carrier frequency, a bandwidth, or a transmission power.

Aspect 9: A method performed by a network node, comprising: generating models of a plurality of cellular networks; simulating radio propagation for a number of user equipment (UEs) of a model of a cellular network, of the models of the plurality of cellular networks; defining one or more channel interference (CI) indicators based at least in part on the simulated radio propagation; and generating a training set including one or more training samples informative of association between: data characterizing a given cell and one or more neighbor cells of the given cell, and one or more values of the one or more CI indicators for one or more cell pairs including the given cell and the one or more neighbor cells of the given cell.

Aspect 10: The method of Aspect 9, wherein the data characterizing the given cell and the one or more neighbor cells includes at least one of: a latitude, a longitude, an azimuth of an antenna, a height of the antenna, a tilt of the antenna, a beam configuration of the antenna, a carrier frequency, a bandwidth, or a transmission power.

Aspect 11: The method of any of Aspects 9-10, wherein the one or more values of the one or more CI indicators for the one or more cell pairs indicate a quantity of UEs, associated with the given cell, predicted to be impacted by the one or more neighbor cells.

Aspect 12: The method of any of Aspects 9-11, wherein simulating the radio propagation for the number of UEs further comprises: simulating the radio propagation using one or more models for path loss, wherein the method further comprises obtaining statistical results regarding the one or more cell pairs based at least in part on the one or more models for path loss, and wherein defining the one or more CI indicators further comprises defining the one or more CI indicators based at least in part on the statistical results.

Aspect 13: The method of any of Aspects 9-12, wherein the model of the cellular network includes randomly distributed cells and wherein the number of UEs are randomly distributed in the model of the cellular network.

Aspect 14: The method of any of Aspects 9-13, wherein the model of the cellular network includes cells that are distributed in accordance with a pre-defined density.

Aspect 15: The method of any of Aspects 9-14, wherein simulating radio propagation for the number of UEs of the cellular network further comprises: iteratively simulating radio propagation for a plurality of numbers of UEs associated with the plurality of cellular networks, wherein defining the one or more CI indicators further comprises defining the one or more CI indicators based at least in part on the radio propagation for the plurality of numbers of UEs.

Aspect 16: The method of any of Aspects 9-16, further comprising training a machine learning (ML) model, using the training set, to provide one or more predicted CI indicators informative of channel interference between cells of a given cellular network.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The invention claimed is:

1. A method performed by a network node, comprising:

obtaining a machine learning (ML) model trained to provide one or more predicted channel interference (CI) indicators informative of channel interference between cells of a cellular network;

selecting, based on an operating bandwidth of a given cell, a first sub-model or a second sub-model as the ML model, wherein the ML model comprises a first sub-model trained for serving cells operating in accordance with a 4G protocol, and a second sub-model trained for serving cells operating in accordance with a 5G protocol;

calculating, using the ML model, the one or more predicted CI indicators using data characterizing the given cell and one or more neighbor cells of the given cell, the data used as input data to the ML model and comprising at least one of a latitude, a longitude, an azimuth of an antenna, a height of the antenna, a tilt of the antenna, or a beam configuration of the antenna of one or both of a given cell or one or more neighbor cells; and providing the one or more predicted CI indicators.

2. The method of claim 1, wherein the one or more predicted CI indicators indicate an impact of the given cell on the one or more neighbor cells, or an impact of the one or more neighbor cells on the given cell.

3. The method of claim 2, further comprising:

configuring a cellular network based at least in part on the one or more predicted CI indicators.

4. The method of claim 3, wherein configuring the cellular network further comprises at least one of:

adding or removing a cell as a neighbor cell of the given cell, adding or removing a cell as a 5G-4G anchor, performing physical cell identifier planning, performing root sequence index planning, performing coverage and capacity optimization, performing mobility load balancing, performing self-healing, or performing non-terrestrial network planning.

5. The method of claim 3, wherein configuring the cellular network further comprises identifying a placement of a cell based at least in part on the one or more predicted CI indicators.

6. The method of claim 1, further comprising selecting the given cell and the one or more neighbor cells as a set of cells of interest, wherein calculating, using the ML model, the one or more predicted CI indicators further comprises:

calculating the one or more predicted CI indicators for the given cell and the one or more neighbor cells based at least in part on the given cell and the one or more neighbor cells being the set of cells of interest.

7. The method of claim 6, wherein selecting the given cell and the one or more neighbor cells as the set of cells of interest is based at last in part on a use case associated with configuring a cellular network including the given cell and the one or more neighbor cells.

8. The method of claim 1, wherein calculating, using the ML model, the one or more predicted CI indicators further comprises calculating the one or more predicted CI indicators further based at least in part on:

a carrier frequency, a bandwidth, or a transmission power of the given cell or the one or more neighbor cells.

9. The method of claim 1, wherein the ML model is trained using a training set generated based at least in part on a model of a network of deployed cells, wherein the deployed cells are characterized by a location, a height, an antenna tilt, a carrier frequency, an operating bandwidth, or a transmission power.

10. An apparatus for wireless communication at a network node, comprising:

a memory; and one or more processors coupled to the memory, the memory and the one or more processors configured to:

obtain a machine learning (ML) model trained to provide one or more predicted channel interference (CI) indicators informative of channel interference between cells of a cellular network;

select, based on an operating bandwidth of a given cell, a first sub-model or a second sub-model as the ML model, wherein the ML model comprises a first sub-model trained for serving cells operating in accordance with a 4G protocol, and a second sub-model trained for serving cells operating in accordance with a 5G protocol;

calculate, using the ML model, the one or more predicted CI indicators using data characterizing the given cell and one or more neighbor cells of the given cell, the data used as input data to the ML model and comprising at least one of a latitude, a longitude, an azimuth of an antenna, a height of the antenna, a tilt of the antenna, or a beam configuration of the antenna of one or both of a given cell or one or more neighbor cells; and provide the one or more predicted CI indicators.

11. The apparatus of claim 10, wherein the one or more predicted CI indicators indicate an impact of the given cell on the one or more neighbor cells, or an impact of the one or more neighbor cells on the given cell.

12. The apparatus of claim 11, wherein the memory and the one or more processors are further configured to configure a cellular network based at least in part on the one or more predicted CI indicators.

13. The apparatus of claim 12, wherein the memory and the one or more processors configured to configure the cellular network further comprises the memory and the one or more processors further configured to at least one of:

add or remove a cell as a neighbor cell of the given cell, add or remove a cell as a 5G-4G anchor, perform physical cell identifier planning, perform root sequence index planning, perform coverage and capacity optimization, perform mobility load balancing, perform self-healing, or perform non-terrestrial network planning.

14. The apparatus of claim 12, wherein the memory and the one or more processors configured to configure the cellular network further comprises the memory and the one or more processors further configured to identify a placement of a cell based at least in part on the one or more predicted CI indicators.

15. The apparatus of claim 10, wherein the memory and the one or more processors are further configured to select the given cell and the one or more neighbor cells as a set of cells of interest, and calculate the one or more predicted CI indicators for the given cell and the one or more neighbor cells based at least in part on the given cell and the one or more neighbor cells being the set of cells of interest.

16. The apparatus of claim 15, wherein the memory and the one or more processors are configured to select the given cell and the one or more neighbor cells as the set of cells of interest based at last in part on a use case associated with configuring a cellular network including the given cell and the one or more neighbor cells.

17. The apparatus of claim 10, wherein the memory and the one or more processors are further configured to calculate, using the ML model, the one or more predicted CI indicators further based at least in part on a transmission power of the given cell or the one or more neighbor cells.

18. A non-transitory computer-readable medium storing a set of instructions for wireless communication, the set of instructions comprising:

one or more instructions that, when executed by one or more processors of an apparatus, cause the apparatus to:

obtain a machine learning (ML) model trained to provide one or more predicted channel interference (CI) indicators informative of channel interference between cells of a cellular network;

select, based on an operating bandwidth of a given cell, a first sub-model or a second sub-model as the ML model, wherein the ML model comprises a first sub-model trained for serving cells operating in accordance with a 4G protocol, and a second sub-model trained for serving cells operating in accordance with a 5G protocol;

calculate, using the ML model, the one or more predicted CI indicators using data characterizing the given cell and one or more neighbor cells of the given cell, the data used as input data to the ML model and comprising at least one of a latitude, a longitude, an azimuth of an antenna, a height of the antenna, a tilt of the antenna, or a beam configuration of the antenna of one or both of a given cell or one or more neighbor cells; and provide the one or more predicted CI indicators.

19. The non-transitory computer-readable medium of claim 18, wherein the one or more predicted CI indicators indicate an impact of the given cell on the one or more neighbor cells, or an impact of the one or more neighbor cells on the given cell.

20. The non-transitory computer-readable medium of claim 19, wherein the one or more instructions further cause the apparatus to configure a cellular network based at least in part on the one or more predicted CI indicators.

* * * * *